United States Patent [19]

Stephens et al.

[11] Patent Number: 5,184,014
[45] Date of Patent: Feb. 2, 1993

[54] OPTO-ELECTRONIC SCALE READING APPARATUS

[75] Inventors: William F. N. Stephens, Badminton; Stephen E. Lummes, Stroud, both of United Kingdom

[73] Assignee: Renishaw plc, Gloucestershire, United Kingdom

[21] Appl. No.: 785,090

[22] Filed: Oct. 30, 1991

[30] Foreign Application Priority Data

Oct. 31, 1990 [GB] United Kingdom ............... 9023659

[51] Int. Cl.$^5$ .............................................. H01J 3/14
[52] U.S. Cl. ........................... 250/237 G; 250/231.16
[58] Field of Search ..................... 250/237 G, 231.16

[56] References Cited

U.S. PATENT DOCUMENTS 4,078,314  3/1978  McMurtry ......................... 33/174
4,800,547  1/1989  Kessels et al. ..................... 369/45
5,064,290  11/1991 McMurtry et al. ............. 250/237 G

FOREIGN PATENT DOCUMENTS 0209340   1/1987   European Pat. Off. .
WO87/07945 12/1987  PCT Int'l Appl. .
WO89/05440 6/1989   PCT Int'l Appl. .
1231029   5/1971   United Kingdom .
1504691   3/1978   United Kingdom .

Primary Examiner—Edward P. Westin
Assistant Examiner—T. Davenport
Attorney, Agent, or Firm—Spencer, Frank & Schneider

[57] ABSTRACT

An opto-electronic scale reading apparatus comprises a light source (20) which projects light via an index grating (22) onto a reflective scale (10). Light is reflected from the scale (10), passes through an auxiliary grating (36) and is incident upon an analyser grating (28), at which a plurality of periodic light patterns are formed. Light from the light source (20) travels initially parallel to the scale plane, and is subsequently deflected through 90° by a beam splitter cube (26); the light is thus incident upon and reflected and off the scale (10) at 90° to the scale plane. This arrangement enables large movements of the readhead in a direction perpendicular to the scale.

7 Claims, 2 Drawing Sheets

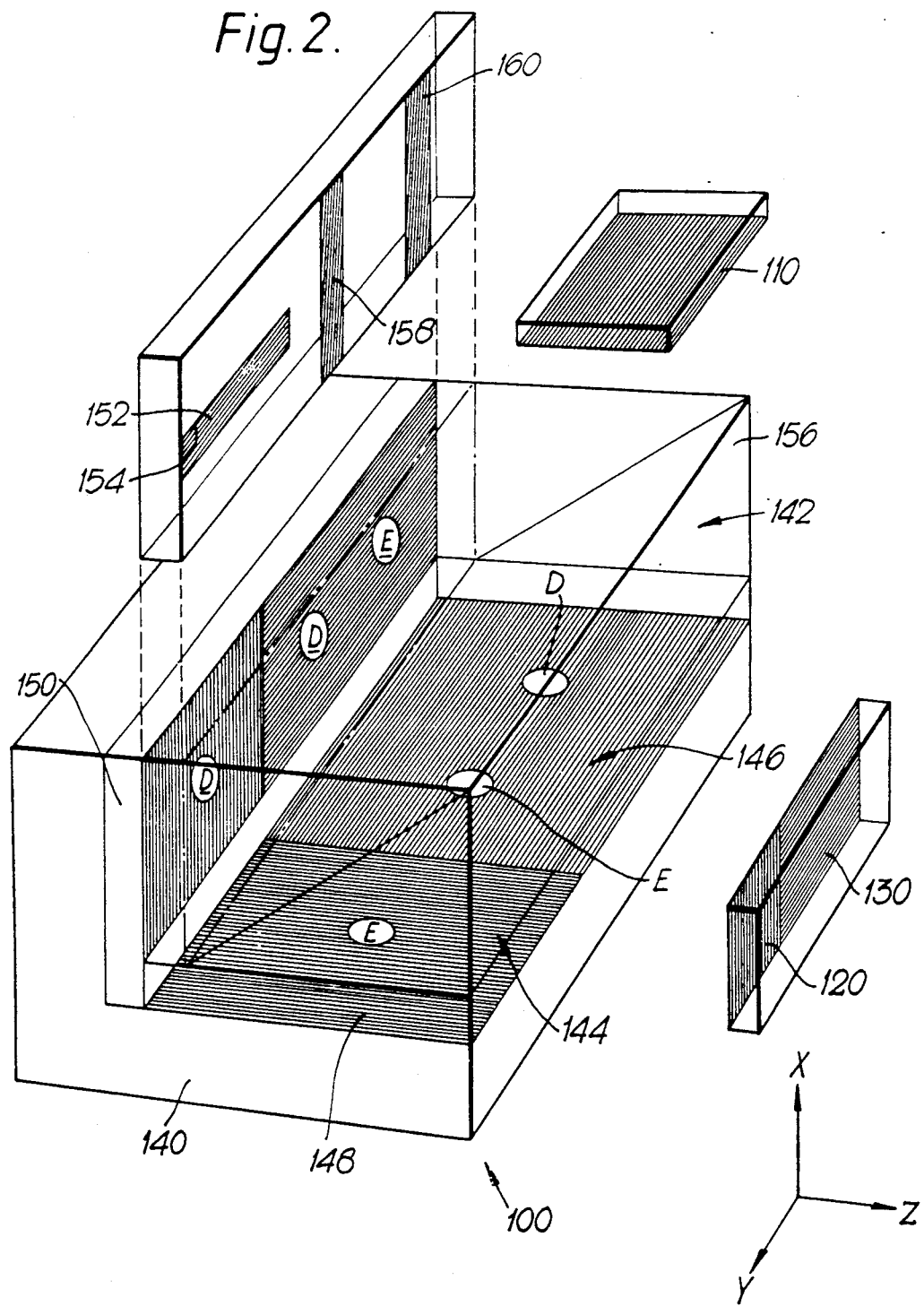

OPTO-ELECTRONIC SCALE READING APPARATUS

BACKGROUND OF THE INVENTION

1. Field of the Invention

The present invention relates to an opto-electronic scale reading apparatus used to measure displacement of one member relative to another.

2. Description of Related Art

One such type of apparatus is known from GB 1,504,691 which discloses a readhead which is movable relative to a reflective scale, and which illuminates the scale with light via an index grating (the light being substantially perpendicular to the scale), to generate a periodic light pattern in the plane of the said index grating. The index grating thus serves as an analyser grating, and relative movement between the scale and the readhead results in a light modulation at the analyser grating. Also disclosed in this document is the generation of moiré fringes by skewing the lines of the index grating fractionally with the respect to the direction of the lines of the scale. Such an arrangement is susceptible to differential contamination of the scale (the propensity of different regions of the scale to interact in a different way with a given beam of incident light), and so is inherently inaccurate.

To overcome this problem it has been proposed to provide an auxiliary grating, or other beam splitting means, up-beam of the analyser grating in order to generate plurality of phase-shifted light intensity modulations at the analyser grating. Such an arrangement is described for example in our co-pending international application WO 89/05440. However, such an arrangement is unsuitable for the situation in which the readhead is movable over a large distance (i.e. greater than 10 mm) relative to the scale in a direction perpendicular to the plane of the scale since, in the above described arrangement, the light is incident upon, and reflected off the scale at an angle. Movement of the readhead relative to the scale perpendicular to the plane of the scale changes the angle of incidence of the light on the scale detected by a detector, and thus requires a re-adjustment of, for example, the optics used to focus light onto relevant photo-detectors.

SUMMARY OF THE INVENTION

A first aspect of the present invention lies in the appreciation of the problem of providing a readhead of the type generally discussed above, in which light is incident upon a reflective scale in a direction substantially perpendicular to the scale plane, and in which a plurality of phase-shifted signals are generated from one or more light intensity modulations at an analyser which are not subject to differential contamination of the scale.

According to the present invention there is provided opto-electronic scale reading apparatus comprising a reflective scale defined by a series or spaced-apart lines, and a readhead movable relative to the scale in the direction of spacing of the lines, the readhead comprising: an index grating; an analyser, the index grating and analyser occupying spatially distinct positions; a light source for illuminating the scale via the index grating, thereby to generate a periodic light pattern in the plane of the analyser, and a modulation of light intensity upon relative movement of the scale and readhead; means for generating from said intensity modulation a plurality of phase-shifted electrical signals, each signal having a frequency corresponding to the frequency of said modulation;

wherein:

means are provided for directing the light
a) along a first path from the index grating to an intersection point;
b) from the intersection point, to the scale and back to the intersection point along a common path in a direction substantially perpendicular to the scale; and
c) from the intersection point to the analyser, along a second path.

Preferably, such an arrangement will be achieved by providing for example a beam splitter cube, in the path of the light passing through the index and/or the light reflected off the scale.

Preferably the phase-shifted light modulations will be generated at the analyser by any suitable method which avoids differential contamination. For example, beam splitting means may be provided for splitting the periodic light pattern at the surface of the analyser into a plurality of such patterns.

An embodiment of the present invention will now be described, by way of example, and with reference to the accompanying drawings in which:

BRIEF DESCRIPTION OF DRAWINGS

FIG. 2 shows a practical example of a 3-D transducer system incorporating a scale and readhead according to the present invention.

DESCRIPTION OF PREFERRED EMBODIMENTS

Figure 1:
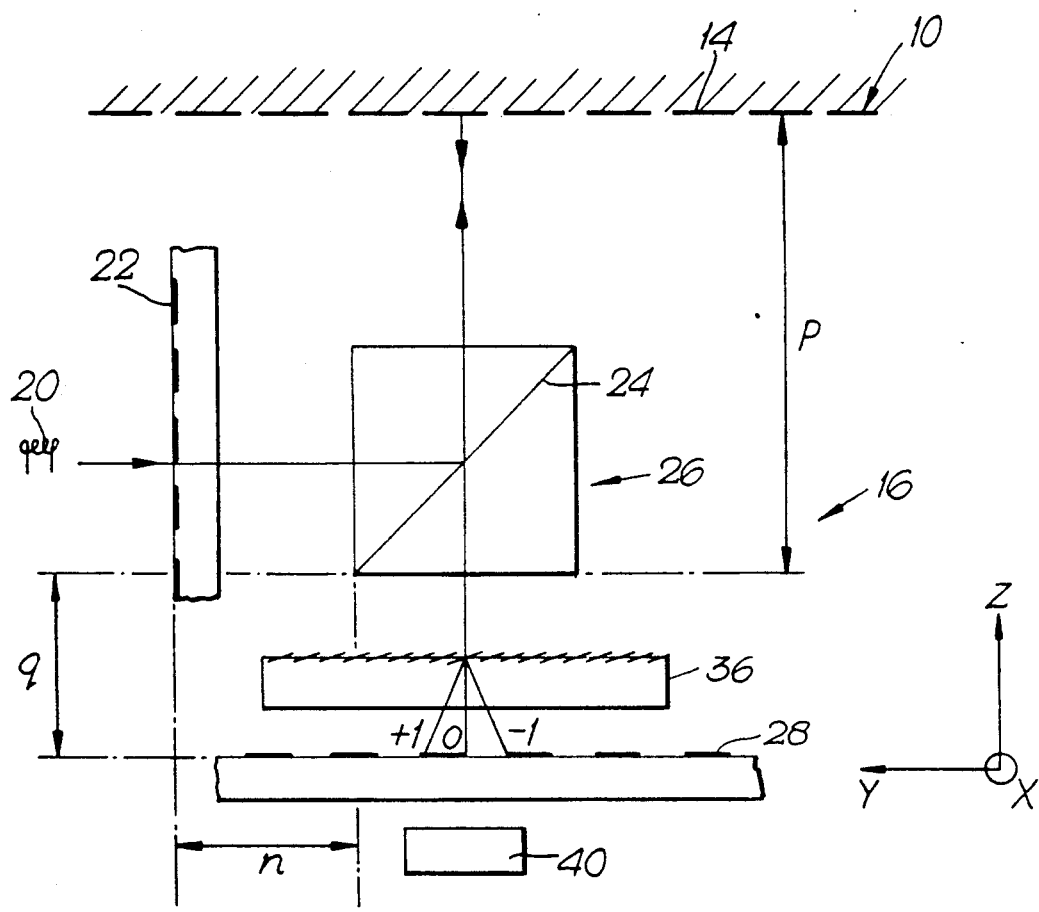
FIG. 1 shows a schematic illustration of a scale and readhead according to the present invention.

Referring now to FIG. 1, a scale 10 extends in a plane defined as the XY plane and has markings 14 which extend parallel to the X direction and are spaced in the Y direction. A readhead 16 is movable relative to the scale in the X,Y and Z directions. The purpose of the readhead however is merely to measure displacement relative to a datum in the Y direction. The readhead 16 comprises a diffuse light source 20 provided adjacent an index grating 22, which has lines extending parallel to the X direction, spaced in the Z direction, and extending in the XZ plane. The beam of light generated by the light source 20 passes through the index grating 22 travelling substantially in the Y direction and is then incident upon a semi-silvered mirror 24 of a beam splitter cube 26. The mirror 24 directs the light beam through 90°, and onto the scale 10 in a direction perpendicular to the plane of the scale. Light reflected off the scale 10 travels back along its path perpendicular to the plane of the scale 10, through the beam splitter cube 26. A periodic light pattern, formed by the interaction of the light passing through the index grating 22 with the scale 10 is generated in the plane of an analyser grating 28; the analyser grating 28 has lines extending in the X direction, spaced in the Y direction, and the grating 28 extends in the XY plane substantially parallel to the scale 10. Relative movement of the readhead and the scale 10 in the Y direction results in the periodic light pattern generated in the plane of the analyser grating 28 moving relative to the analyser grating 28, thereby producing a modulation of light intensity indicative of the relative movement between the readhead and scale 10, which is detected by a photo-detector array 40.

In order to determine the direction (i.e. +Y or −Y) of relative movement of the scale and readhead a plurality of phase-shifted light modulations are generated at the analyser grating 28 by an auxiliary grating 36. The auxiliary grating 36 extends in the XY plane, and has lines extending substantially parallel to the Y direction and spaced substantially in the X direction. However, the lines of the auxiliary grating 36 are skewed fractionally with respect to the Y direction (typically by the order of about one degree), and thus light passing through the auxiliary grating 36 will be diffracted into a plurality of orders (+1,0,−1) spaced apart in the X direction and each shifted fractionally relative to each other in the Y direction. A periodic light pattern will be produced at the analyser grating 28 in respect of each of the said orders, and thus when the readhead 16 moves relative the scale 10 in the Y direction each of the individual light patterns will produce a light intensity modulation. However, since each of the patterns is shifted fractionally relative to each other image in the Y direction, a plurality of intensity modulations occurring in a phase-shifted relationship will result. The construction and function of the auxiliary grating 36 are described more fully in our co-pending international application case WO 89/05440. Each individual intensity modulation is focused by focusing optics (not shown) onto a photo-detector of a photo-detector array 40, which generates an electrical signal corresponding to the intensity of light incident thereon.

In order to generate a periodic light pattern at the analyser grating 28 in accordance with the teaching of GB 1,504,691, the distance between the index grating 22 and the scale 10 must be equal to the distance between the scale 10 and the analyser grating 28. This condition is automatically fulfilled provided the readhead is constructed so that the distances q and r are equal, since the distance p is common to both the incident and reflected paths. The commonality of the distance p to both the incident and reflected paths makes the readhead insensitive to variations in the distance between the scale 10 and readhead, i.e. movements of the readhead relative to the scale 10 in the Z direction. This makes this type of scale and readhead particularly suitable for use as a transducer in a measuring probe, used to determine deflection of a stylus holding member relative to a fixed structure in a given direction (an example of a measuring probe with which the present invention may be used is described in our U.S. Pat. No. 4,078,314).

Referring now to FIG. 2, a practical embodiment of a three-dimensional transducer arrangement for use in a measuring probe such as the probe mentioned above is illustrated. In the illustrated arrangement, it is envisaged that the readhead system 100 would be supported on the fixed part of a measuring probe, whereas the three scales 110,120,130 are provided on the movable (i.e. stylus-carrying) structure of such a measuring probe. The transducer system 100 comprises a right-angle bracket 140, which performs a supporting function for all the optical elements which make up the readhead system 100. The readhead system 100 consists of three individual readheads 142,144,146 for measuring displacement of the movable structure relative to the fixed structure in the X,Y and Z directions respectively. Each of the readheads has an emitter and a detector carried in the right-angle bracket 140, and for clarity these are schematically indicated in FIG. 2 by the letters E and D respectively. Each individual readhead 142,144,146 comprises an index and analyser grating; for example readhead 144 comprises an index grating 148 and an analyser grating 150. Both the index grating 148 and analyser grating 150 are supported by the bracket 140. An auxiliary grating 152, provided to generate plurality of phase-shifted light intensity modulations at the surface of the analyser grating 150, is positioned directly in front of the analyser grating 150. The auxiliary grating 152 is provided in aperture 154 which restricts the amount of light passing through the grating 152; this provides easier separation of the phase-shifted light intensity modulations at the surface of the analyser 150. A single beam splitting element 156 is provided for all the readheads, the beam splitter 156 taking the form of a rectangular parallelepiped.

Since the index and analyser gratings on the readheads 142,146 extend in the same direction, a single grating may be used for each of the index and analyser gratings of the readheads 142 or 146. Each of the readheads 142,146 has an auxiliary grating 158,160, serving the same function as for the readhead 144. In the preferred feature of this embodiment, both the index and analyser gratings of the readheads 142,144,146 are provided on a single glass plate, as are the auxiliary gratings 152,158,160. This provides easier assembly of the readhead system 100.

It is not essential to employ auxiliary gratings to generate phase-shifted light intensity modulations. Other means may be employed such as the provision of a plurality of offset analyser gratings each of which yields a distinct phase. Furthermore, it is not essential to provide an analyser grating. An analyser as described in GB 1,231,029 may be provided.

We claim:

1. Opto-electronic scale reading apparatus comprising a reflective scale defined by a series of spaced-apart lines, and a readhead movable relative to the scale in the direction of spacing of the lines, the readhead comprising: an index grating; an analyser, the index grating and analyser occupying spatially distinct positions; a light source for illuminating the scale via the index grating, thereby to generate a periodic light pattern in the plane of the analyser, and a modulation of light intensity upon relative movement of the scale and readhead; means for generating from said intensity modulation a plurality of phase-shifted electrical signals, each signal having a frequency corresponding to the frequency of said modulation;

wherein:

means are provided for directing the light
a) along a first path from the index grating to an intersection point;
b) from the intersection point, to the scale and back to the intersection point along a common path in a direction substantially perpendicular to the scale; and
c) from the intersection point to the analyser, along a second path.

2. Apparatus according to claim 1 wherein the first and second paths are of equal lengths.

3. Apparatus according to claim 1 wherein a beam splitter is provided at said intersection point.

4. Apparatus according to claim 1 wherein the index grating and analyser extend in perpendicular planes.

5. Apparatus according to claim 3, comprising means for generating at said analyser, a plurality of phase-shifted light intensity modulations, and photo-detecting means for detecting said modulations thereby to generate said phase-shifted electrical signals.

6. Apparatus according to claim 5 wherein said plurality of light intensity modulations are provided by a further beam-splitter positioned in the light path between said first mentioned beam splitter and the analyser.

7. Apparatus according to claim 1 wherein the analyser is an analyser grating.

* * * * *